US011600131B2

(12) United States Patent
López Ruíz et al.

(10) Patent No.: US 11,600,131 B2
(45) Date of Patent: Mar. 7, 2023

(54) METHOD AND KEYBOARD FOR PRODUCT SELECTION

(71) Applicant: AZKOYEN, S.A., Peralta (ES)

(72) Inventors: Jose Maria López Ruíz, Peralta (ES); Emilio De Hita Hernández, Peralta (ES); Eduardo Andueza Ciriza, Peralta (ES)

(73) Assignee: AZKOYEN, S.A., Peralta (ES)

( * ) Notice: Subject to any disclaimer, the term of this patent is extended or adjusted under 35 U.S.C. 154(b) by 0 days.

(21) Appl. No.: 17/237,647

(22) Filed: Apr. 22, 2021

(65) Prior Publication Data

US 2021/0335077 A1 Oct. 28, 2021

(30) Foreign Application Priority Data

Apr. 23, 2020 (EP) .................................... 20382331

(51) Int. Cl.
*G07F 11/00* (2006.01)
*G06F 3/02* (2006.01)
*G06Q 20/18* (2012.01)

(52) U.S. Cl.
CPC ............ *G07F 11/00* (2013.01); *G06F 3/0202* (2013.01); *G06Q 20/18* (2013.01)

(58) Field of Classification Search
CPC .......... G07F 11/00; G07F 9/00; G06F 3/0202; G06F 3/04186; G06Q 20/18; G06Q 20/00; H03K 17/955; H03K 17/9622
See application file for complete search history.

(56) References Cited

U.S. PATENT DOCUMENTS

| | | | | |
|---|---|---|---|---|
| 2006/0241966 A1* | 10/2006 | Walker | ............... | G06Q 30/0237 |
| | | | | 700/232 |
| 2009/0135031 A1* | 5/2009 | Rockwell | ........... | H03K 17/9622 |
| | | | | 341/33 |
| 2018/0173368 A1* | 6/2018 | Zhang | ................... | G06F 3/0482 |
| 2018/0217710 A1* | 8/2018 | Cholasta | ............ | H03K 17/9622 |
| 2020/0326812 A1* | 10/2020 | Choo | .................... | G06F 3/0488 |

FOREIGN PATENT DOCUMENTS

WO 2004025835 A1 3/2004

* cited by examiner

*Primary Examiner* — Amit Chatly
(74) *Attorney, Agent, or Firm* — Kunzler Bean & Adamson

(57) ABSTRACT

The method for product selection comprises the steps of selecting a product among a plurality of options of different products, said selection being carried out by remotely signaling a label that represents the selected product; checking that no other selection has been detected; checking that the detected selection lasts longer than a predetermined period of time or more than a predetermined electromagnetic field strength; and dispensing the selected product if it has been verified that no other selection has been detected and if it has been verified that the selection lasts longer than said predetermined period of time and less than the predetermined electromagnetic field strength, or canceling the selection of the product if another selection has been detected or the detected selection lasts less than said predetermined period of time or is greater than the predetermined electromagnetic field strength.

10 Claims, 1 Drawing Sheet

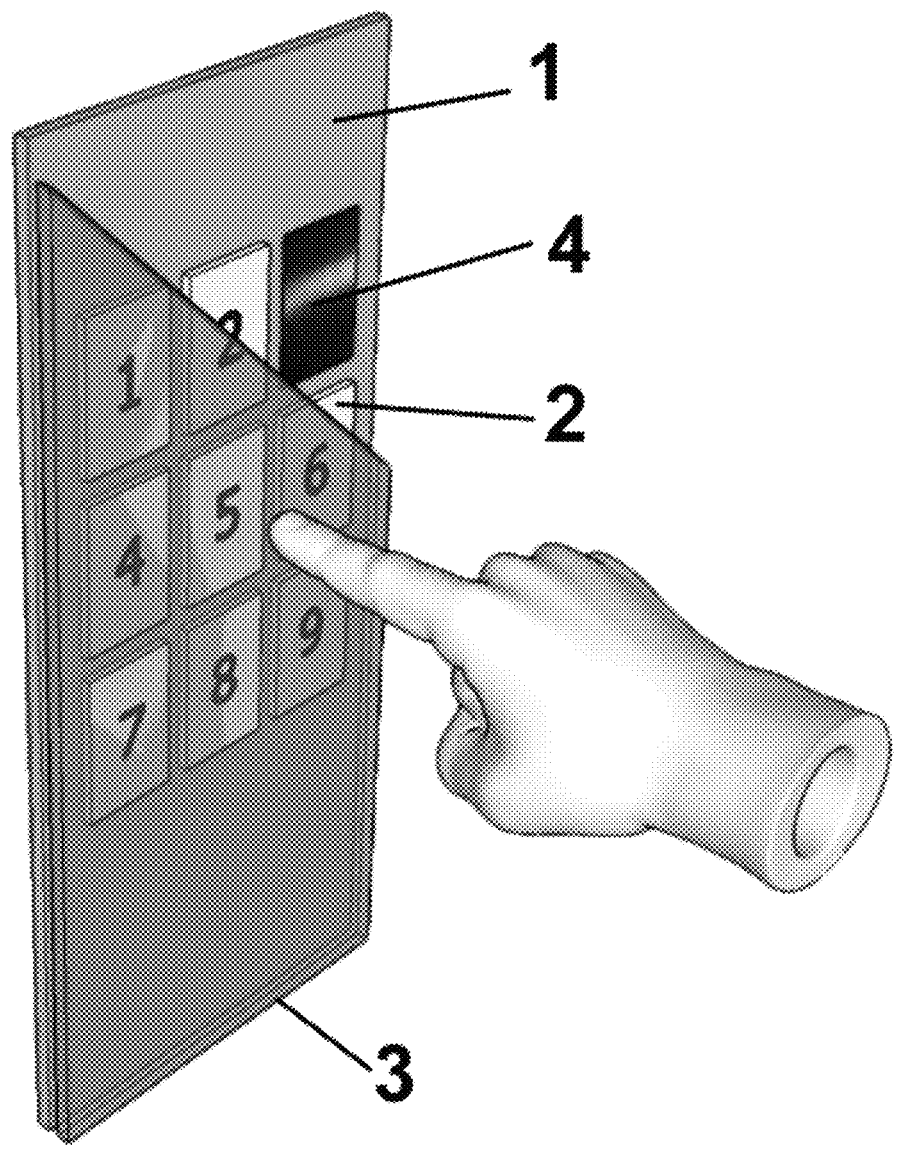

METHOD AND KEYBOARD FOR PRODUCT SELECTION

The present invention relates to a method and keyboard for product selection, which can be used, in particular, in product dispensing machines, such as, for example, in coffee dispensing machines.

BACKGROUND OF THE INVENTION

Dispensing or vending machines dispense items or products such as beverage cans, groceries, coffee, etc., so that they can function alone and without the need for an employee.

The user of these dispensing machines must select the desired product through a keyboard, either by means of a physical keyboard, for example, with numbers and/or letters, or by means of a keyboard on a touch screen.

This keyboard is used during the day by a large number of people, and it becomes dirty due to this use, which can imply a risk for the transmission of diseases due to viruses or bacteria that one of the users may leave behind. Furthermore, these keyboards are routinely subject to wear and tear.

From document WO2004025835 A1 a keyboard for product vending machines is known that comprises selection panels that do not contain mechanical elements that are subject to wear or tear, but their activation is as similar as possible to traditional keyboards based on physical buttons.

These types of keyboards are commonly referred to as touch keyboards and their operation consists of physically touching the outside of the desired selection.

Non-contact selection systems are also known, which are developed, for example, for multimedia game systems. Normally this type of selection systems are based on the recognition of movements that guide the selection of the desired option through several phases, such as, for example, movements from left to right to navigate between the available options and later another movement to validate the selected option.

However, these non-contact selection systems known in other fields of the art are not commonly used in dispensing machines.

DESCRIPTION OF THE INVENTION

Therefore, an object of the present invention is to provide a method and keyboard for product selection that improves the performance of currently known keyboards.

With the method and keyboard for product selection according to the invention, the aforementioned drawbacks are solved, presenting other advantages that will be described below.

According to a first aspect, the present invention relates to a method for product selection, comprising the steps of:
  selecting a product among a plurality of options of different products, said selection being made by remotely signaling a label that represents the selected product;
  checking that no other selection has been detected;
  checking that the detected selection lasts longer than a predetermined period of time or more than a predetermined electromagnetic field strength; and
  dispensing the selected product if it has been verified that no other selection has been detected and if it has been verified that the selection lasts longer than said predetermined period of time and less than the predetermined electromagnetic field strength, or canceling the selection of the product if another selection has been detected or the detected selection lasts less than said predetermined period of time or is greater than the predetermined electromagnetic field strength.

According to a preferred embodiment, if more than one selection is detected substantially simultaneously, a recalibration step is performed.

Preferably, product selection is performed by detecting the proximity of an object to one of a plurality of capacitive sensors, which detect variations in the electromagnetic field.

Furthermore, said detection of the proximity of an object is preferably carried out sequentially for said plurality of capacitive sensors.

The method for product selection in accordance with the present invention preferably also comprises the step of performing a reading scan of each individual sensor at each operating cycle.

According to the second aspect, the present invention refers to a product selection keyboard, which comprises a plurality of labels, each of which identifies a product, each label being associated with a capacitive sensor, which also comprises means of electronic control to carry out the method for product selection as described above.

According to a preferred embodiment, said capacitive sensors are mounted on the same plane on a printed circuit board, and said capacitive sensors are mounted on the form of a matrix.

Furthermore, in the product selection keyboard according to the present invention, the printed circuit board advantageously comprises a protective layer, for example made of glass or plastic.

The method and keyboard for product selection according to the present invention provides, among others, the following advantages:
  It is not necessary to physically touch any element;
  Allows a direct selection, without the need for any additional stage to validate the selection;
  It has the appearance of a digital screen (images protected behind a transparent sheet), but in reality no adjustment or software programming of the images is necessary, but it is enough to change the label of the selection.

BRIEF DESCRIPTION OF THE DRAWINGS

For a better understanding of what has been stated, some drawings are enclosed in which, schematically and only as a non-limiting example, a practical case of embodiment is represented.

FIG. 1 is a perspective view of the product selection keyboard in accordance with the present invention.

DESCRIPTION OF A PREFERRED EMBODIMENT

As shown in FIG. 1, the product selection keyboard according to the present invention comprises the following components.

The keyboard comprises a printed circuit board 1 comprising circuits necessary to control capacitive sensors 4, which are located below some labels 2. In the FIG., one of the labels has been removed to show a capacitive sensor 4 placed underneath it.

Each label 2 represents a product to be selected by a user, each label 2 being associated with a single product and a single capacitive sensor 4.

A label can include one or more numbers, one or more letters, letters and numbers, images, or a combination thereof.

Capacitive sensors 4 are conductive surfaces that, following the principles of a capacitor, capture variations in the electromagnetic field of the environment. In this way, when an object, for example, a finger, approaches a label 2, its associated capacitive sensor 4 detects said variation of the electromagnetic field and determines the selection of the product that the label 2 represents without contact.

Furthermore, the printed circuit board 1 also comprises a transparent protective layer 3, normally made of glass or transparent plastic. The function of this protection layer is to protect the keyboard from the outside. This is the surface that the user must indicate.

The keyboard according to the present invention also comprises control means, such as a processor, which performs the method for product selection as described below.

The method for product selection according to the present invention is as follows:

For the user, the method consists simply of selecting a product among a plurality of options of different products, said selection being made by remotely signaling a label that represents the selected product, that is, by bringing a finger to the label 2 that represents the desired product.

To avoid errors and optimize the use of the keyboard in accordance with the present invention, the steps of checking that no other selection has been detected and checking that the detected selection lasts longer than a predetermined period of time or more than one predetermined electromagnetic field strength, are performed.

In this way, the selected product is dispensed if it has been verified that no other selection has been detected and if it has been verified that the selection lasts longer than said predetermined time period and less than the predetermined electromagnetic field strength, or the product selection is canceled if another selection has been detected or the detected selection lasts less than said predetermined period of time or is greater than the predetermined electromagnetic field strength.

The electromagnetic field strength is determined to avoid external noises, for example, produced by the user's electronic devices, such as his mobile phone.

Furthermore, to avoid errors, if more than one selection is detected substantially simultaneously, a recalibration step is performed.

In the method according to the present invention, the detection of the proximity of an object, for example, a finger of a user is performed sequentially for said plurality of capacitive sensors 4 and a reading scan of each individual sensor 4 is also performed in each operating cycle.

In this way, the interferences between said sensors 4 are reduced and a detection having greater sensitivity is achieved.

Although reference has been made to a specific embodiment of the invention, it is clear to a person skilled in the art that the described method and keyboard are susceptible to numerous variations and modifications, and that all the mentioned details can be substituted by others being technically equivalent, without departing from the scope of protection defined by the appended claims.

The invention claimed is:

1. Method for product selection, characterized in that it comprises the steps of:
    selecting a product among a plurality of options of different products, said selection being made by positioning an object in close proximity to, but not touching, a label that represents the selected product;
    checking that no other selection has been detected;
    detecting a period of time and an electromagnetic field strength during said selection, wherein the electromagnetic field strength is the strength of an electromagnetic field induced when the object is in close proximity to the label;
    checking that the selection lasts longer than a predetermined period of time and that the detected electromagnetic field strength is greater than or smaller than a predetermined electromagnetic field strength; and
    dispensing the selected product if no other selection has been detected and if it has been verified that the selection lasts longer than that the predetermined period of time and that the detected electromagnetic field strength is smaller than the predetermined electromagnetic field strength, or canceling the product selection if another selection has been detected or the detected selection lasts less than said predetermined period of time or that the detected electromagnetic field strength is greater than the predetermined electromagnetic field strength.

2. Method for product selection according to claim 1, wherein, if more than one selection is detected substantially simultaneously, a recalibration step is carried out.

3. Method for product selection according to claim 1, wherein the product selection is performed by detecting the proximity of an object to one of a plurality of capacitive sensors (4).

4. Method for product selection according to claim 3, wherein said detection of the proximity of an object is carried out sequentially for said plurality of capacitive sensors (4).

5. Method for product selection according to claim 3, which also comprises the step of performing a reading scan of each individual sensor (4) in each operating cycle.

6. Product selection keyboard, comprising a plurality of labels (2), each of which identifies a product, each label (2) being associated with a capacitive sensor (4), characterized in that it comprises electronic control means for performing the method for product selection according to claim 1.

7. Product selection keyboard according to claim 6, wherein said capacitive sensors (4) are mounted on the same plane on a printed circuit board (1).

8. Product selection keyboard according to claim 6, wherein said capacitive sensors (4) are mounted in the form of a matrix.

9. Product selection keyboard according to claim 7, wherein the printed circuit board (1) comprises a protection layer (3).

10. Method for product selection according to claim 1, wherein the object is a hand of a user.

\* \* \* \* \*